(12) United States Patent
Challener et al.

(10) Patent No.: US 6,470,454 B1
(45) Date of Patent: Oct. 22, 2002

(54) METHOD AND APPARATUS FOR ESTABLISHING COMPUTER CONFIGURATION PROTECTION PASSWORDS FOR PROTECTING COMPUTER CONFIGURATIONS

(75) Inventors: David Carroll Challener; Barry Douglas Atkins, both of Raleigh; Todd W. Arnold, Charlotte, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/052,554

(22) Filed: Mar. 31, 1998

(51) Int. Cl.⁷ .............................. G06F 11/30; H04L 9/00; H04L 12/14
(52) U.S. Cl. .................. 713/202; 713/200; 713/201; 713/300; 709/229
(58) Field of Search ................ 713/202, 200, 713/201, 300, 323, 324; 380/1, 229, 241, 283, 279, 284; 709/229

(56) References Cited

U.S. PATENT DOCUMENTS

| | | | | |
|---|---|---|---|---|
| 4,951,249 A | * | 8/1990 | McCung et al. | 364/900 |
| 5,402,492 A | * | 3/1995 | Goodman et al. | 380/25 |
| 5,535,409 A | * | 7/1996 | Lavoire et al. | 395/800 |
| 5,699,514 A | * | 12/1997 | Durinovic-Johri et al. | 395/188.01 |
| 5,708,777 A | * | 1/1998 | Sloan et al. | 395/188 |
| 5,751,812 A | * | 5/1998 | Anderson | 380/48 |
| 5,774,650 A | * | 6/1998 | Chapman et al. | 395/186 |
| 5,781,793 A | * | 7/1998 | Lavoire et al. | 395/800 |
| 5,818,936 A | * | 10/1998 | Mashayekhi | 380/25 |
| 5,818,939 A | * | 10/1998 | Davis | 380/49 |
| 5,841,970 A | * | 11/1998 | Tanuki | 395/187 |
| 5,850,443 A | * | 12/1998 | Van Oorschot et al. | 380/21 |
| 5,870,470 A | * | 2/1999 | Johnson et al. | 380/6 |
| 5,881,226 A | * | 3/1999 | Veneklase | 395/188.01 |
| 5,887,131 A | * | 3/1999 | Angelo | 395/188 |
| 5,892,906 A | * | 4/1999 | Chou et al. | 395/188 |
| 6,079,021 A | * | 6/2000 | Abadi et al. | 713/202 |
| 6,141,760 A | * | 10/2000 | Abadi et al. | 713/202 |

* cited by examiner

Primary Examiner—James P. Trammell
Assistant Examiner—Firmin Backer
(74) Attorney, Agent, or Firm—Bracewell & Patterson, LLP; Carlos Munoz-Bustamante

(57) ABSTRACT

A method and apparatus is provided for facilitating the generation and use of computer system configuration passwords which can be utilized in an enterprise or organization to allow authorized users having knowledge of the password associated with a particular data processing system to make and change configuration decisions, but which prevents unauthorized users from making and changing such configuration decisions. In the preferred embodiment, a unique identifier (such as a serial number) and an enterprise secret key are supplied to a one-way cryptographic hash function in order to generate the configuration passwords which are unique to each data processing system of the plurality of data processing system of the enterprise or organization.

14 Claims, 7 Drawing Sheets

METHOD AND APPARATUS FOR ESTABLISHING COMPUTER CONFIGURATION PROTECTION PASSWORDS FOR PROTECTING COMPUTER CONFIGURATIONS

BACKGROUND OF THE INVENTION

1. Field of the Invention

The present invention relates generally to systems for securing computing devices, and in particular to systems for securing the access to systems for establishing computer system settings or configurations.

2. Description of the Prior Art

Many personal computers have an administrative password, which must be entered in order to change system settings or other critical parameters that the user should not normally alter. In IBM ThinkPad laptop computers, this is known as the Privilege Access Password, or PAP.

In larger corporate organizations, the computer support group often wants to keep these passwords secret, except when it is necessary to have a user modify the setting that are under its control. If each computer is loaded with a different password, this presents a sizeable logistical problem in keeping track of the password corresponding to each individual computer.

Similarly, when shipping PCs from point A to point B. it is helpful to be able to "lock" the systems with a combination of PAP and Power On Password (POP), to deter theft of the PC in transit. Again, if many computers are being shipped, and each computer is loaded with a different password, this presents the same sizeable logistical problem in keeping track of the password corresponding to each individual computer.

The help desk for end-user support would like a way to quickly and easily find the password for any user's machine, while that user is on the telephone with the problem. The help desk consultant can then provide the password to the user over the phone. Following the consultant's instructions, the user can then enter the password, enabling the system configuration changes that are needed to solve his or her problem. It should be difficult, however, to find the password for a given machine without consulting with the help desk team.

In a similar way, the recipient of a shipment of computers would like to be able to unlock them, by quickly determining the password of the systems received, without worrying about waiting for the passwords to be shipped separately.

SUMMARY OF THE INVENTION

It is one objective of the present invention to provide a method and apparatus for use in a data processing system which allows for password protection of access to software control systems which may be utilized to modify data processing system configuration selections previously made by an authorized user having knowledge of the password.

It is another objective of the present invention to provide such protection of system configurations selections in a manner which allows the system configuration protection to be implemented on an enterprise level in an organization having a plurality of data processing systems dispensed to a plurality of authorized users, and which allows a service authority within the enterprise to quickly and easily generate and issue the system configuration passwords to the individual users to allow (and thereafter protect) system configuration selections.

It is yet another object of the present invention to generate such system configuration passwords by utilizing a unique, but not necessarily secret, identifier of each one of said plurality of data processing systems, and an enterprise-wide secret key, to be provided as inputs to at least one one-way hash function, in order to develop a hash output string, which can be further processed in order to develop said system configuration passwords which are unique for each data processing system.

These and other objectives are obtained as is now described. A method and apparatus is provided for securing computer configuration of a plurality of data processing systems in a particular organization. A plurality of data processing systems are provided. For the plurality of data processing systems an identifying information type is selected, which relatively uniquely identifies each of the plurality of data processing systems from one another, but which is not necessarily secret. In the preferred embodiment, this identifying information may constitute the serial number of the data processing systems. Then, for the particular organization, an organization password is selected which defines a relatively secret organization cryptographic key. Then at least one cryptographic hash function is provided. The cryptographic hash function receives as an input the particular identifying information of a particular one of the plurality of data processing systems and the particular organization password. The cryptographic function generates a hash output which can be processed to develop a relatively unique (and seemingly random) configuration protection password for the particular data processing system. This is repeated for all the data processing systems so that each has its own relatively unique configuration protection password. Then, system configuration watchdog software modules are loaded onto each of the plurality of data processing systems. The watchdog software operates to monitor for user requests for access to changes in at least one of a plurality of protected computer configuration attributes, and challenges the user to enter a password. If a correct password is entered, the configuration of the computer may be changed; however, if the correct password is not entered, access to changing the configuration of the computer system is denied. The plurality of relatively unique configuration protection passwords are generated, one for each one of the data processing systems in the set, and are distributed to authorized users in mass or individually, as contact is made with the system administration. Thereafter, the watchdog software is utilized to prevent changes in system configuration, unless the correct password is entered.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
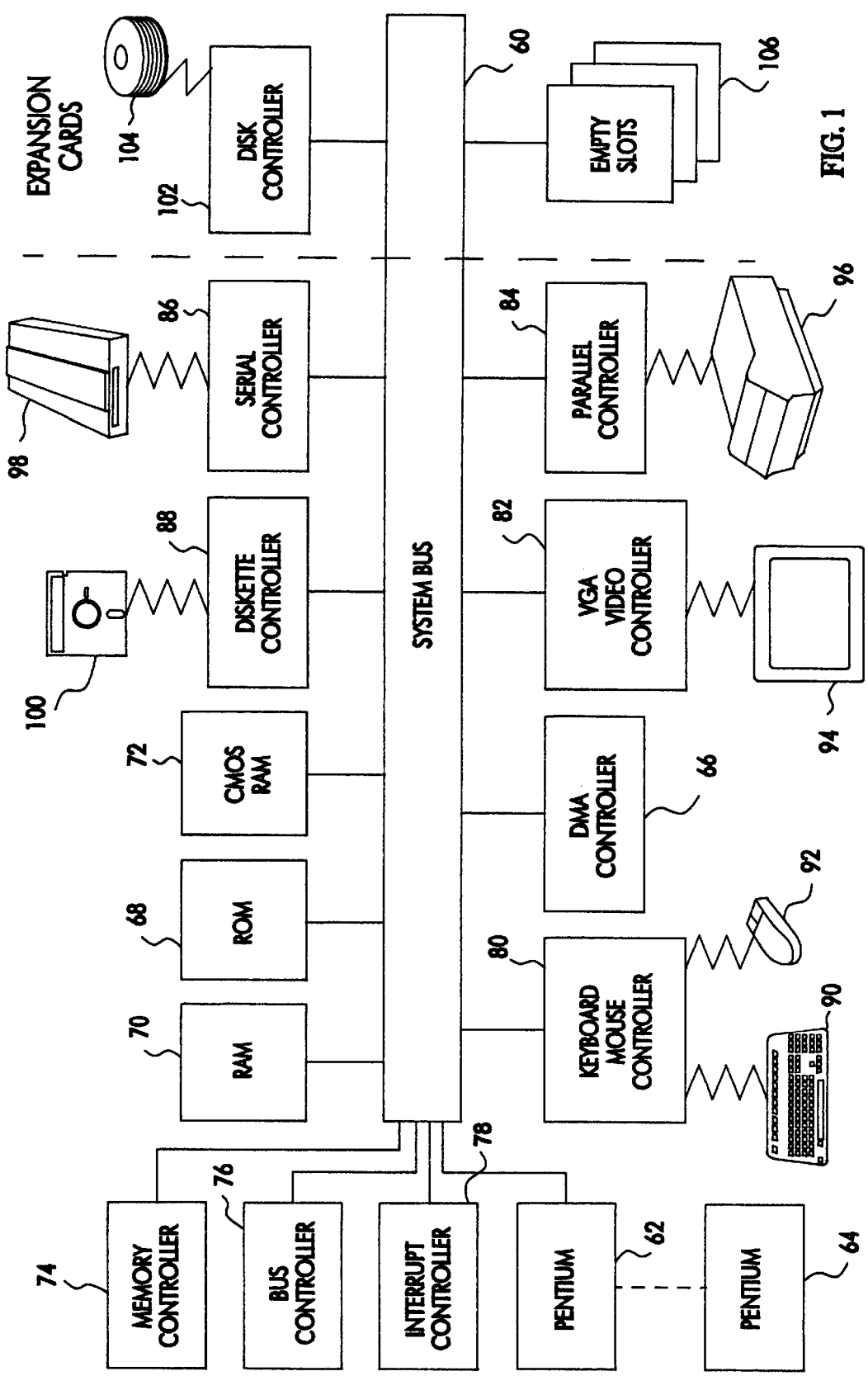
FIG. 1 is a block diagram representation of a data processing system which depicts the various conventional components which may be present, some of which are subject to configuration selections.

FIG. 1 provides a block diagram depiction of a plurality of components which make-up a data processing system. Many of these components can be set to particular configurations or settings. A data processing system may include a particular system bus 60 architecture, a particular memory controller 74, bus controller 76, interrupt controller 78, keyboard mouse controller 80, keyboard mouse controller 80, DMA controller 66, VGA video controller 102, parallel controller 84, serial controller 86, diskette controller 88, and disk controller 82. Additionally, a plurality of empty or occupied slots 106 may be present in a particular data processing system. End devices such as printer 96, monitor 94, mouse 92, keyboard 90, diskette 100, or disk drive 104 may also have one or more attributes which may be set in a predetermined manner.

A problem in the prior art is that of protecting configuration of data processing systems in an organization without any undue burden on the "help desk" or system administrator. The best solution to the problem of the prior art is to use an algorithmic method to generate the password for each computer. The support organization generates and loads the passwords as the machines are distributed to the end users. The help desk can reproduce the password for any of the machines whenever it is needed. There is no reason to maintain a long and trouble-prone list of passwords, and the user has no way of determining the password without help from the support organization.

In order to do this, the password must be generated from two different kinds of information:

(1) First there must be a piece of information that is unique to each computer. The machine serial number (S/N) is a good candidate for this.

(2) There must be a secret piece of information known only to the support organization. There are two reasons for this:

(a) The end users must not be able to generate the passwords for their computers, without contacting the support organization. One cannot rely on the password derivation algorithm remaining secret, so the only way to accomplish this is to use a data element that is known only to the support organization.

(b) The same algorithm will probably be used by multiple organizations, and each will want to be sure that there are the only ones who can generate passwords for their domain of computers. The way to differentiate between organizations is to use domain-unique data that is used as input to the algorithm.

The password itself must be a character string that the user can type on the computer keyboard. Generally, it is fixed length, either seven or eight characters.

This leads us to the conclusion that we need an algorithm with the following characteristics:

(1) It accepts two data elements as input. One is the computer serial number, which is generally a character string. The other data element is a secret value known only to the support organization; we will refer to this as the key. The key can be any length or format, but a convenient choice is to make it an eight character alphanumeric string.

(2) It combines the two data elements in a way that results in a seemingly random output, which cannot be computed without the secret key, and which cannot be used to determine the value of that key.

The output must be in the form of a password, which contains only the characters acceptable for passwords on the target computer.

This is an ideal application for a one-way cryptographic hash function, also known as a message digest function. Examples include SHA-1, MD5, and MDC2. A function of this type can accept an input string of arbitrary length, and transform it into a random-appearing fixed-length output string know as the hash. While it is generally easy to compute the output string from the input, it is computationally infeasible to reconstruct the input if you are given the output. Thus, we can use one of these hash functions to compute a value from the serial number and the secret key, and that value will meet characteristics 1 and 2 from the list above. A post-processing stage can be used to transform the hash value into an acceptable password string. The transformation must be done in such a way that each possible character is equally likely to occur in the password. For example, on the average, there should not be more "a" characters in the password than there are "z" characters.

The invention described in this application provides a simple, yet very effective way to manage security passwords for a population of centrally-managed computers. Without the assistance of an authorized party, no user can obtain the administrative password that is needed to change critical settings in the computer. The system administrators, however, can quickly and easily generate the administrative password for any computer in the population, simply by obtaining the serial number from the user. This is much easier to manage than alternatives such as a database or list containing each machine's serial number, and a corresponding randomly-generated password. There is no need for such a list, and no data has to be computed in advance.

The password generation process was implemented for an application involving ThinkPad laptop computers. The following parameters were used. The password contains 7 alphanumeric characters (A–Z and 0–9), with no lower case. The machine serial number contains 7 significant alphanumeric characters, which are forced to upper case. Optionally, it an include a dash, which will be ignored in the password generation process. The secret key is 8 bytes in length. If entered from the keyboard, the key is limited to alphanumeric characters, which are forced to upper case. The key can also be read from a disk file; in this case, the 8 bytes can contain any value desired, and no conversion is performed. The hashing algorithm is SHA-1, the Secure Hash Algorithm, as defined in the U.S. government FIPS 180-1, distributed by the National Institute of Standards and Technology.

The help desk consultant is prompted to enter the Think-Pad serial number, which the machine user reads to him over the phone. The program forces all alphabetic characters in the S/N to upper case, and deletes any dashes that are in the S/N string.

If the consultant started the program with the appropriate option and file name, the secret key is read from that file. Otherwise, the consultant is prompted to enter the key at his keyboard; the program forces all alphabetic characters in this key to upper case. The program then constructs a single string containing the key concatenated to the end of the serial number string. The program computes the SHA-1 hash of this 15-byte string, resulting in a 20-byte hash value. The hash is transformed into a 7 character password, containing only upper-case alphanumeric characters. (The conversion process is described below.) The consultant reads this password to the user, who enters it on his ThinkPad computer, unlocking access to the restricted configuration functions. The consultant then provides instructions on how to solve the user's reported problem, by setting or updating machine settings. The process uses a constant array conversion table, which contains the set of acceptable password characters: the numeric characters 0–9, and the upper case alphabetic characters A–Z. It uses the hash value to produce 7 index values between 0 and 35, and it uses each one to index into conversion table to look up one character for the password string.

Figure 2:
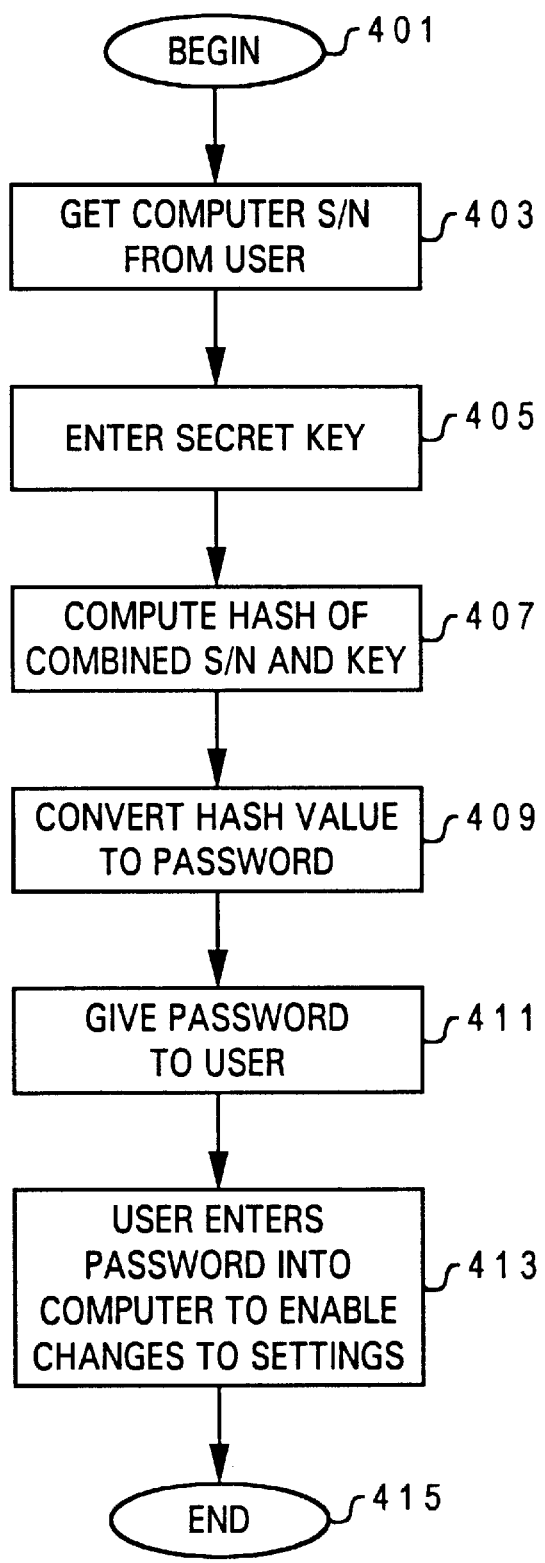
FIG. 2 is a high-level flowchart representation of the preferred embodiment of the method and apparatus for establishing computer configuration protection passwords of the present invention.

FIG. 2 is a flowchart representation of the process utilized to generate passwords in accordance with the present invention. The process begins at block 401, and continues at block 403, wherein the serial number for a particular data processing is obtained from the user. That serial number is entered as an input to a cryptographic hash function. Additionally, in accordance with block 405, a secret enterprise key is also entered as input to the cryptographic hash function. Then in accordance with block 407, the cryptographic hash function is utilized to compute a hash value which is processed to develop a password based upon the serial number for the data processing system and the enterprise key. Next, in accordance with block 409, the output of cryptographic hash function is converted into a password. Typically, this involves some post-cryptographic processing as will be discussed below. Then, in accordance with block 411, the password is distributed to the user associated with a particular data processing system. In accordance with block 413, the user enters the password into the computer when challenged by a watchdog program. If the correct password is entered, the user is allowed to change configurations or other settings of the components which make up the data processing system. The process ends at block 415.

Figure 3:
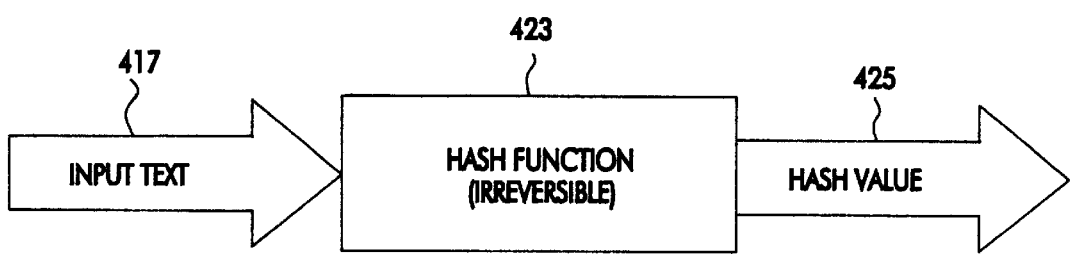
FIG. 3 is a block diagram representation of an exemplary hash process utilized in the preferred embodiment of the method and apparatus for generating an apparently random hash output.

FIG. 3 is a pictorial block diagram representation of the cryptographic hash function utilized in accordance with the present invention. As is shown, hash function 423 is adapted to receive text input 417 which preferably is a combination of the serial number of the data processing system and the relatively secret, enterprise-wide key. The cryptographic function 423 produces as an output a hash value which is processed to develop a password 425.

Figure 4A:
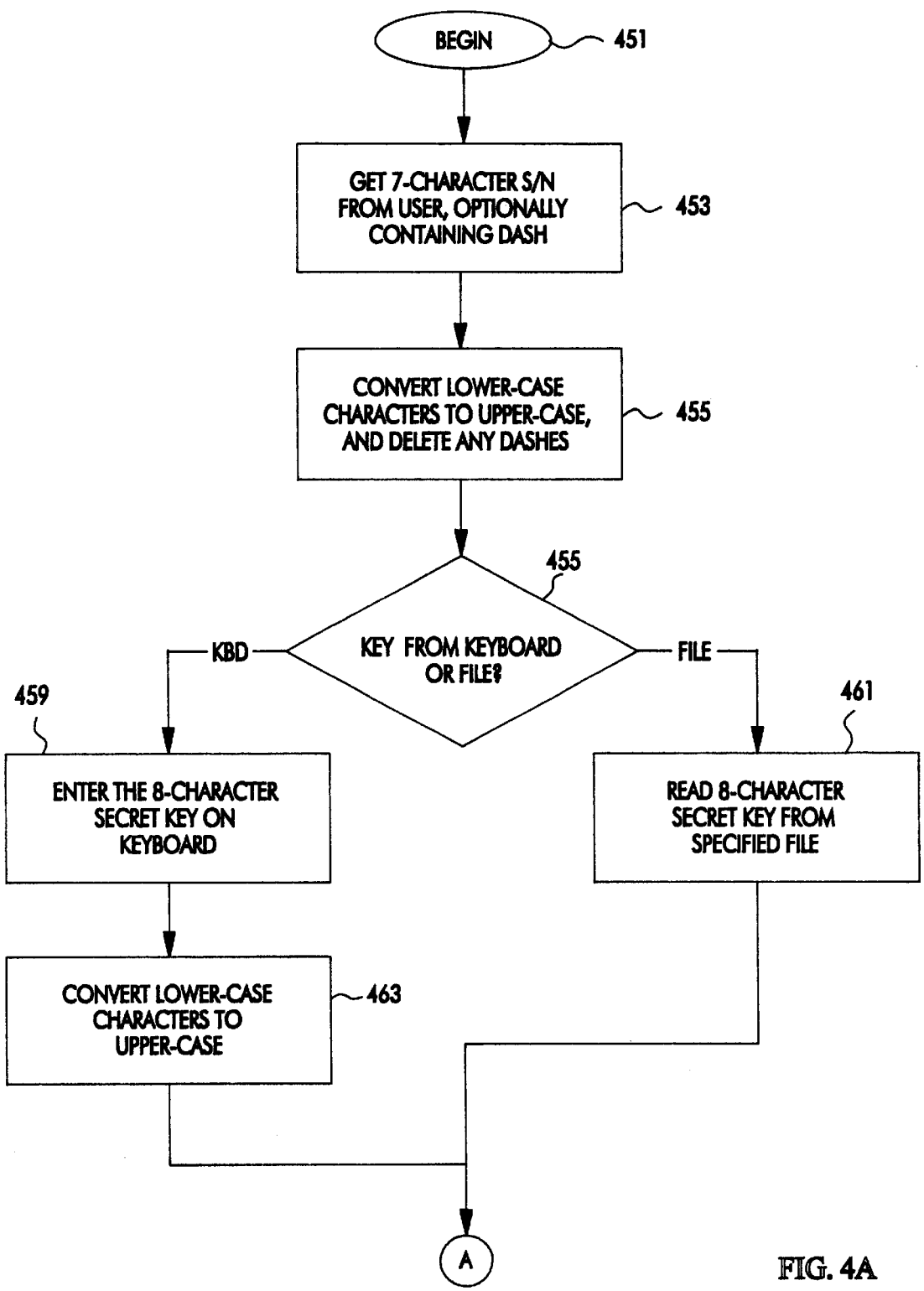
FIG. 4 is a flowchart representation of a more detailed main flow of the preferred embodiment of the method and apparatus for establishing computer configuration protection passwords of the present invention.
Figure 4B:
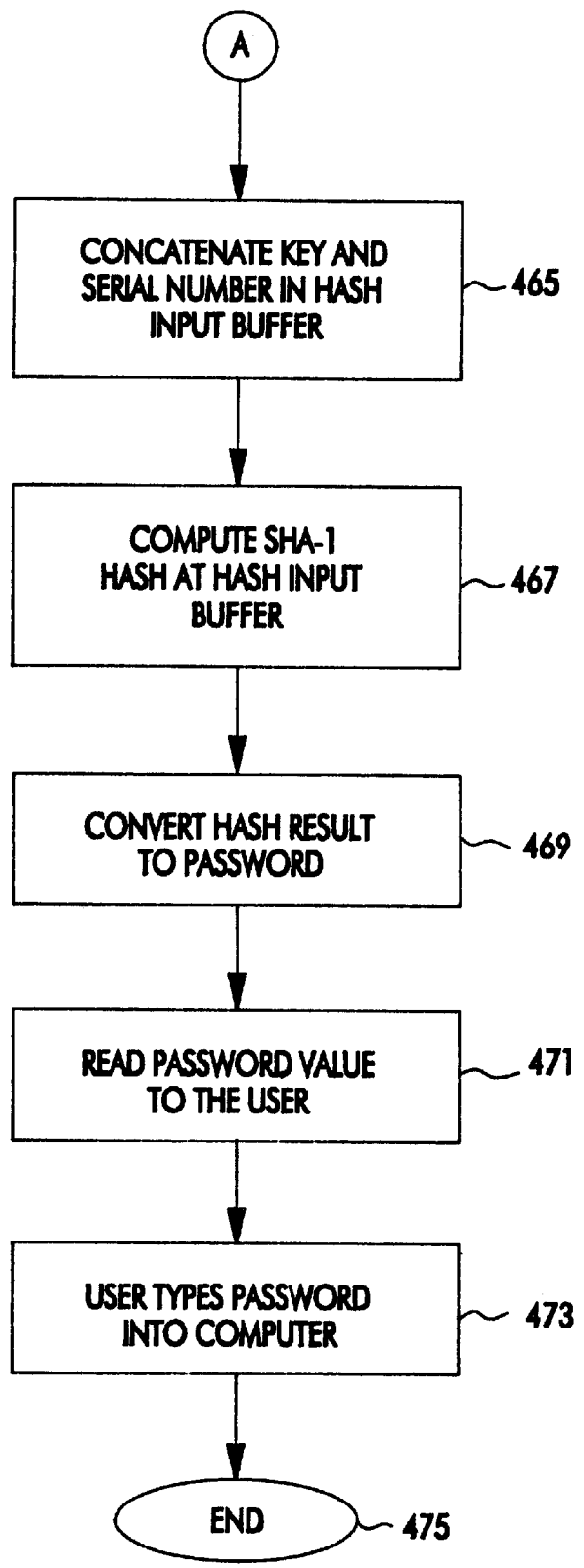

FIG. 4 is a more detailed flowchart representation of the general steps described above in connection with FIGS. 2 and 3. The process begins at software block 451, and continues at software block 453, wherein the seven-character serial number for the computer is obtained. Optionally, this seven-character serial number includes a dash or other character. This requires some pre-hash processing of the information in order to render the information suitable as an input for the cryptographic function. This is represented by software block 455, wherein the serial number is converted from lower-case characters to upper-case characters, and any extraneous material (such as dashes) is deleted.

Next, in accordance with block 457, the data processing system determines whether the enterprise key is to be obtained from keyboard entry or from a file. If keyboard entry is utilized, control passes to block 459. If keyboard entry is not utilized, control passes to block 461. In accordance with block 459, the eight-character enterprise-wide, relatively-secret key is entered on the keyboard. In accordance with block 463, the key is converted from lower-case characters to upper-case characters. Alternatively, if the key is read from a file, control passes to block 461, wherein the eight-character, relatively-secret, enterprise-wide key is read from a specified file. Control then passes to block 465, wherein the key and serial number are concatenated in a hash input buffer. The concatenated combination of the serial number and the password serves as the input for the hash function.

Next, in accordance with block 467, the cryptographic function is utilized to compute the SHA-1 hash from the hash input buffer. Next, in accordance with block 469, the result of the cryptographic hash function are converted into a password utilizing post-cryptographic processing as will be described below. Then, control passes to block 471, wherein the password values is read or provided to the user. Then, in accordance with block 473, the user utilizes the password to enter in response to a challenge provided by his/her data processing system. If the correct password is entered, then the user is allowed entry into the programs which allow changes to the configuration or setting of the data processing system. The process ends at block 475.

Figure 5:
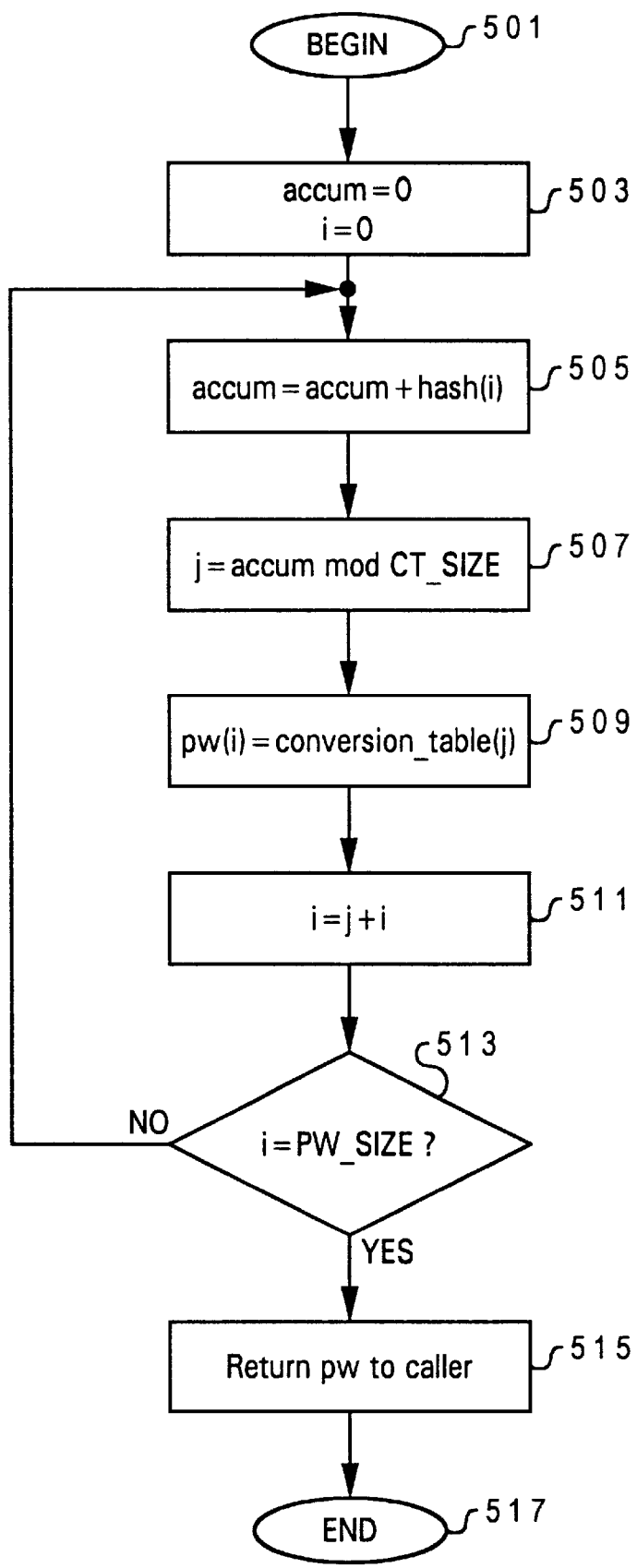
FIG. 5 is a flowchart representation of the preferred embodiment of the process of converting the output of the hash function of FIG. 3 into usable passwords.

FIG. 5 is a flowchart representation of post-cryptographic processing which may be performed in order to generate relatively user-friendly, and uniformly formatted passwords. The process begins at block 501, and continues at block 503, wherein an accumulator and a counter are set to zero. In accordance with block 505, the value of the accumulator is set to the previous value plus the byte of the hash function output indexed by counter i. Next, in accordance with step 507, the value "J" is set to the remainder obtained when the accumulator is divided by the constant CT_SIZE. CT_SIZE is the length of the conversion table conversion_ table which contains the array of characters: "0, 1, 2, 3, 4, 5, 6, 7, 8, 9, A, B, C, D, E, F, G, H, I, J, K, L, M, N, O, P, Q, R, S, T, U, V, W, X, Y, Z." The size of the table is thirty-two bytes. Then, in accordance with block 509, PW(i) is set to the character of conversion-table indexed by counter "j." Then, in accordance with block 511, the counter i is incremented by 1. Then, in accordance with block 513, i is examined to determine whether it equals the value of "PW_SIZE?" the number of characters required for the output password; if not, control passes to block 505; however, if I does equal PW-SIZE, then control passes to block 515, wherein the password is returned, and the process ends at block 517.

Figure 6:
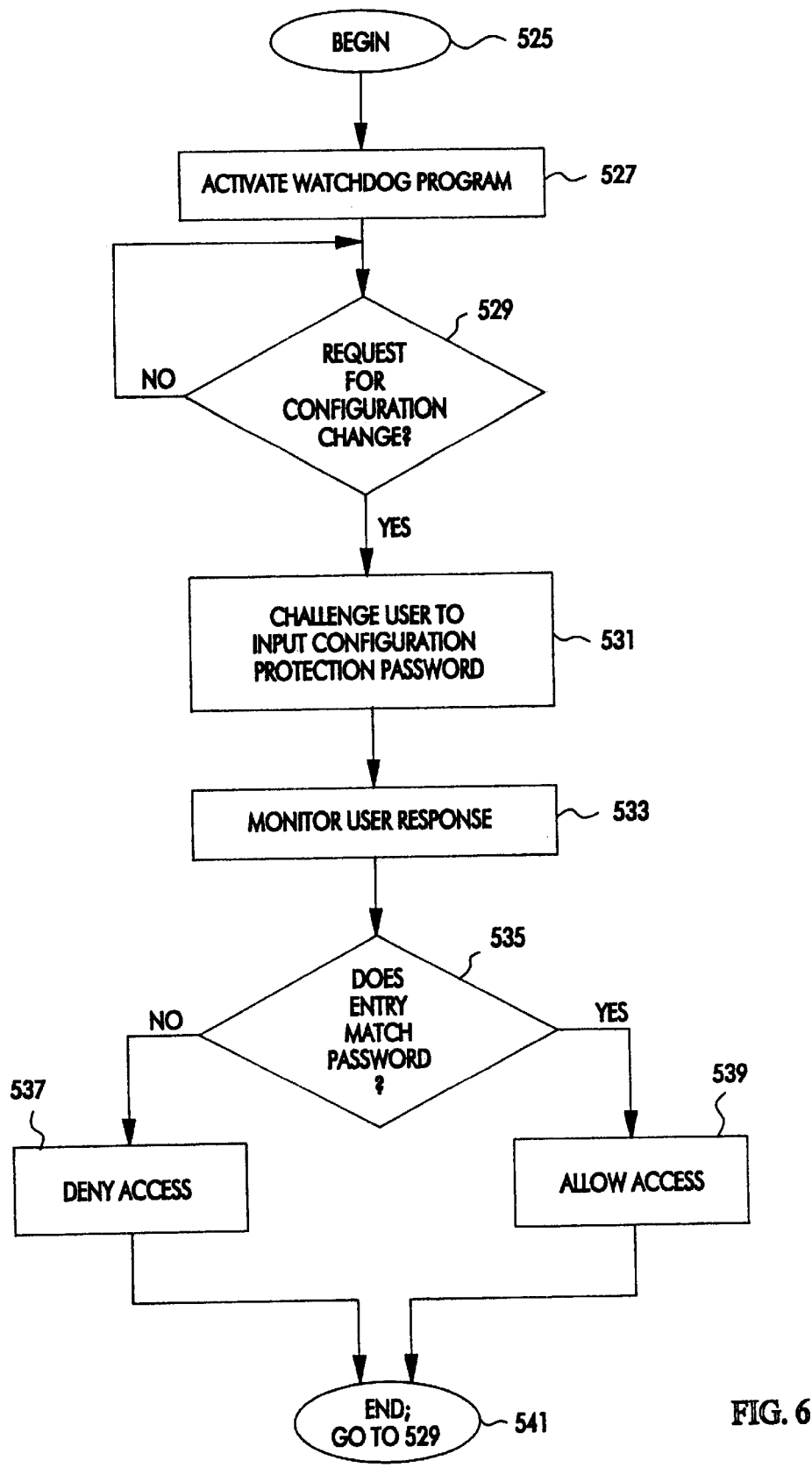
FIG. 6 is a flowchart representation of the basic operation of the computer configuration protection software of the present invention.

FIG. 6 is a flowchart representation of the watchdog software utilized to prevent configuration changes in accordance with the present invention. The process begins at block 525, and continues at block 527, wherein the watchdog program is activated. Next, in accordance with block 529, the data processing system monitors for any request for configuration changes, and continues such monitoring until a request is detected. Once a request is detected control passes to block 531, wherein the watchdog software challenges the user to input the particular input configuration protection password associated with the particular data processing system being utilized. Next, in accordance with block 533, the data processing system monitors for user response. Then, in accordance with block 535, the response is analyzed. If the entry matches the password, control passes to block 539, wherein access to configuration changes is allowed; however, if the password does not match the password identified with a particular data processing system, control passes to block 537, wherein the watchdog program denies access to the configuration change. All processing ends at block 541.

In the preferred embodiment, the user is only allowed a predetermined number of attempts to enter a correct password in order to avoid "hammering" (the repeated entry of passwords) as a means for bypassing security.

While the embodiment described herein utilizes a hash function in order to generate a seemingly random output, in alternative embodiments true cryptographic function could be utilized instead. The weakness of utilizing a cryptographic function is that cryptographic functions are not one-way functions, which presents some risk. Additionally, American export control law limits the export of some cryptographic functions.

What is claimed is:

1. A method for providing configuration protection for a plurality of data processing systems in a particular organization, said method comprising:

utilizing a hash function to generate character-based passwords for each of a plurality of supported data processing systems, based on an organization password and a unique identifier associated with each of said plurality of data processing systems;

storing one of said character-based passwords on each of said plurality of supported data processing systems and providing said one of said character-based passwords to a user thereof;

providing each of said plurality of supported data processing systems with watchdog software that allows a user to change protected configuration attributes only after said user has entered said stored password;

providing said users with access to said unique identifiers;

providing a support center, but not said users, with said organization password; and providing said support center with said hash function, such that said support center need not maintain a list associating users with corresponding character-based passwords and instead utilizes said hash function, said organization password, and said unique identifier to recompute said stored character-based password.

2. A method according to claim 1, wherein:

said step of utilizing said hash function to generate character-based passwords comprises:
      computing hash values based on said organization password and said unique identifiers; and
      converting said hash values to alphanumeric values; and said step of storing one of said character-based passwords on each of said plurality of supported data processing systems comprises storing said alphanumeric values as said character-based passwords, such that said watchdog program matches an attempted password entered via a keyboard with said stored password without deciphering said attempted password.

3. A method according to claim 2, further comprising:

receiving, at said support center, a user request for said stored password for a particular supported data processing system, said request including an unformatted identifier for said particular supported data processing system;

receiving, at an administrative data processing system that contains said hash function, user input corresponding to said unformatted identifier;

deriving a formatted identifier from said input data by omitting any non-alphanumeric characters in said input data and converting all letters in said input data to a single case; and utilizing said hash function to recompute said stored character-based password from said formatted identifier.

4. A method according to claim 3, further comprising granting access to change said protected configuration attributes of said particular supported data processing system in response to receipt of said recomputed password.

5. A method according to claim 2, wherein:

said step of computing said hash value comprises generated said hash value with a first predetermined size; and said step of converting said hash value to an alphanumeric value comprises generating said alphanumeric value with a second predetermined size that is less than said first predetermined size.

6. A method according to claim 2, wherein said unique identifiers comprise respective serial numbers of said plurality of supported data processing systems.

7. A method according to claim 2, wherein said step of utilizing said hash function to generate character-based passwords comprises generating a password for each of said plurality of supported data processing systems that differs from any password generated for any other of said plurality of supported data processing systems.

8. An improved distributed data processing system comprising:

a plurality of supported data processing systems;

a unique identifier associated with each of said plurality of supported data processing systems;

a character-based password stored in each of said plurality of supported data processing systems, wherein said character-based password was computed by a hash function, based on said unique identifier and an organization password;

watchdog software in each of said plurality of supported data processing systems that allows a user to change protected configuration attributes only after said user has entered said stored password;

an administrative data processing system at a support center, said administrative data processing system including said hash function and said support center having exclusive access to said organization password, relative to said users, such that said support center need not maintain a list associating users with corresponding character-based passwords and instead utilizes said hash function, said organization password, and said unique identifier to recompute said stored character-based password.

9. An improved distributed data processing system according to claim 8, wherein said hash function comprises:

hash logic that computes a hash value based on said organization password and said unique identifier; and conversion logic that generates said character-based password from said hash value by converting said hash value to an alphanumeric value constituting said character-based password, such that said watchdog program matches an attempted password entered via a keyboard with said stored password without deciphering said attempted password.

10. An improved distributed data processing system according to claim 9, wherein said administrative data processing system comprises:

an input device;

input logic that receives an unformatted identifier for a particular supported data processing system from said input device; and identifier formatting logic that derives a formatted identifier from said unformatted identifier by omitting any non-alphanumeric characters in said unformatted identifier and converting all letters in said unformatted identifier to a single case; and wherein said hash function derives said character-based password from said formatted identifier.

11. An improved distributed data processing system according to claim 10, wherein said watchdog software grants access to change said protected configuration attributes of said particular supported data processing system in response to receipt of said recomputed password.

12. An improved distributed data processing system according to claim 9, wherein:

said hash logic generates said hash value with a first predetermined size; and said conversion logic generates said alphanumeric value with a second predetermined size that is less than said first predetermined size.

13. An improved distributed data processing system according to claim 9, wherein said unique identifiers comprise respective serial numbers of said plurality of supported data processing systems.

14. An improved distributed data processing system according to claim 9, wherein said hash function generates unique passwords for each of said plurality of supported data processing systems.

* * * * *